(12) United States Patent
Singhal et al.

(10) Patent No.: US 11,449,413 B2
(45) Date of Patent: Sep. 20, 2022

(54) ACCELERATING DEVELOPMENT AND DEPLOYMENT OF ENTERPRISE APPLICATIONS IN DATA DRIVEN ENTERPRISE IT SYSTEMS

(71) Applicant: Tata Consultancy Services Limited, Mumbai (IN)

(72) Inventors: Rekha Singhal, Thane West (IN); Gautam Shroff, Gurgaon (IN); Dheeraj Chahal, Pune (IN); Mayank Mishra, Thane West (IN); Shruti Kunde, Thane West (IN); Manoj Nambiar, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/345,166

(22) Filed: Jun. 11, 2021

(65) Prior Publication Data

US 2021/0390033 A1 Dec. 16, 2021

(30) Foreign Application Priority Data

Jun. 12, 2020 (IN) .............................. 202021024810

(51) Int. Cl.
 *G06F 11/36* (2006.01)
 *G06N 3/02* (2006.01)
 (Continued)

(52) U.S. Cl.
 CPC .......... *G06F 11/368* (2013.01); *G06F 9/4843* (2013.01); *G06F 11/3684* (2013.01);
 (Continued)

(58) Field of Classification Search
 CPC ...... G06F 9/4843; G06F 11/3684; G06N 3/02
 (Continued)

(56) References Cited

U.S. PATENT DOCUMENTS

| 2019/0213115 | A1* | 7/2019 | Takawale | ............... G06N 5/046 |
| 2020/0202265 | A1* | 6/2020 | Nair | ................... G06Q 10/0631 |
| 2020/0410386 | A1* | 12/2020 | Loving | ................ G06K 9/6218 |

FOREIGN PATENT DOCUMENTS

FR 3 097 069 A1 12/2020

OTHER PUBLICATIONS

Abdelfattah, Mohamed S., et al. "DLA: Compiler and FPGA overlay for neural network inference acceleration." 2018 28th international conference on field programmable logic and applications (FPL). IEEE, 2018.pp. 411-418 (Year: 2018).*

(Continued)

*Primary Examiner* — Satish Rampuria
(74) *Attorney, Agent, or Firm* — Finnegan, Henderson, Farabow, Garrett & Dunner LLP

(57) ABSTRACT

This disclosure relates generally to accelerating development and deployment of enterprise applications where the applications involve both data driven and task driven components in data driven enterprise information technology (IT) systems. The disclosed system is capable of determining components of the application that may be task-driven and/or those components which may be data-driven using inputs such as business use case, data sources and requirements specifications. The system is capable of determining the components that may be developed using task-driven and data-drive paradigms and enables migration of components from the task driven paradigm to the data driven paradigm. Also, the system trains a reinforcement learning (RL) model for facilitating migration of the identified components from the task driven paradigm to the data driven paradigm. The system is further capable of integrating the migrated and existing components to accelerate development and deployment an integrated IT application.

7 Claims, 8 Drawing Sheets

(51) Int. Cl.
*G06K 9/62* (2022.01)
*G06F 9/48* (2006.01)
*G06F 40/20* (2020.01)

(52) U.S. Cl.
CPC ........ *G06F 11/3692* (2013.01); *G06K 9/6256* (2013.01); *G06N 3/02* (2013.01); *G06F 40/20* (2020.01)

(58) Field of Classification Search
USPC .................................................. 717/124–178
See application file for complete search history.

(56) References Cited

OTHER PUBLICATIONS

Firestone, Daniel, et al. "Azure Accelerated Networking: {SmartNICs} in the Public Cloud." 15th USENIX Symposium on Networked Systems Design and Implementation (NSDI 18). 2018.pp. 51-66 (Year: 2018).*

Koziolek, Anne, Heiko Koziolek, and Ralf Reussner. "PerOpteryx: automated application of tactics in multi-objective software architecture optimization." Proceedings of the joint ACM SIGSOFT conference—QoSA and ACM SIGSOFT symposium 2011.pp. 33-42 (Year: 2011).*

Deeptimahanti et al., "An Automated Tool for Generating UML Models from Natural Language Requirements," 2009 IEEE/ACM International Conference on Automated Software Engineering (2009), pp. 680-682.

* cited by examiner

ACCELERATING DEVELOPMENT AND DEPLOYMENT OF ENTERPRISE APPLICATIONS IN DATA DRIVEN ENTERPRISE IT SYSTEMS

PRIORITY CLAIM

This U.S. patent application claims priority under 35 U.S.C. § 119 to: India Application No. 202021024810, filed on Jun. 12, 2021. The entire contents of the aforementioned application are incorporated herein by reference.

TECHNICAL FIELD

The disclosure herein generally relates to the field of development and deployment of software application, and, more particularly, to system and method for accelerating development and deployment of enterprise applications where the applications involve both data driven and task driven components in data driven enterprise information technology (IT) systems.

BACKGROUND

Traditional approach for building software applications utilizes task-driven paradigm, where a software application is composed of a set of tasks to be executed in a traditional information technology (IT) environment consisting of data management, network management, middleware and application servers. The aforementioned components of IT systems are also built using task-driven programming. Such traditional IT systems paradigm is referred to as Software1.0 (SW1.0). The traditional IT systems are deterministic in nature, which is kept in consideration while developing and deploying applications.

Owing to an exponential research in Machine Learning (ML) and/or Deep learning (DL), applications and also certain parts of IT components employ model-based functions which are probabilistic in nature. The model-based functions are data-driven, and the IT systems employing such data-driven model-based functions in IT components thereof are referred to as belonging to Software 2.0 (SW2.0) paradigm.

Currently, software applications consist of both task-driven (SW1.0) functions and data-driven models (SW2.0). There is need to identify application's components suitability for SW 1.0 or SW 2.0 paradigm, build them, integrate SW1.0 and SW2.0 components as unified application, and testing this software application on Enterprise IT 2.0 consisting of a mix of SW1.0 and SW2.0 components.

SUMMARY

Embodiments of the present disclosure present technological improvements as solutions to one or more of the above-mentioned technical problems recognized by the inventors in conventional systems. For example, in one embodiment, a method for accelerating development and deployment of an information technology (IT) application is provided. The method includes receiving, via one or more hardware processors, an input data comprising requirement specifications, use-cases and data sources associated with the IT application. Further, the method includes identifying, via the one or more hardware processors, a plurality of components for the development of the IT application based on mapping of the input data with a unified modelling language (UML) model. Furthermore the method includes applying natural language processing techniques (NLP) to the UML model to determine context for each or a subset of a UML node from amongst a plurality of UML nodes associated with the UML model, via the one or more hardware processors. Also, the method includes identifying, via the one or more hardware processors, a first set of components capable of being developed using a task driven (SW1.0) paradigm and a second set of components capable of being developed using a data driven (SW2.0) paradigm from amongst the plurality of components, wherein the first and the second set of components are identified based on mapping of the input data with a context associated of the each or the subset of the plurality of UML nodes. Moreover, the method includes identifying one or more components from the first set of components to be migrated from the task driven paradigm to the data driven paradigm, via the one or more hardware processors. Also, the method includes training, via the one or more hardware processors, a reinforcement learning (RL) model for facilitating migration of the one or ore components from the first set of components to be migrated from the task driven paradigm to the data driven paradigm. Training the RL model includes obtaining a plurality of test cases associated with the task driven paradigm from a rule-based engine, performing multiple executions of a task driven function based on the plurality of test cases, wherein the task driven function is associated with the task driven paradigm, generating one or more recommendations for the multiple executions in form of 'actions' for the data driven paradigm, receiving one or more responses to the one or more recommendations from a user, wherein the one or more responses are recorded by the RL model, associating a reward for each of ('action', response) pairs, generating a plurality of tuples comprising (action, response, rewards), and training a deep learning (DL) model based on the plurality of tuples to obtain an enhanced version of the one or more components in the data driven paradigm, wherein the DL model is trained until a stopping criteria associated with a threshold value of the reward is met. The method further includes integrating, via the one or more hardware processors, the enhanced version of the one or more components with the second set of components to develop an integrated IT application In another aspect, a system for accelerating development and deployment of an information technology (IT) application is provided. The system includes one or more communication interfaces; and one or more hardware processors coupled to the memory via the one or more communication interfaces, wherein the one or more hardware processors are configured by the instructions to receive an input data comprising requirement specifications, use-cases and data sources associated with the IT application. Further, the one or more hardware processors are configured by the instructions to identify a plurality of components for the development of the IT application based on a mapping of the input data with a unified modelling language (UML). Furthermore, the one or more hardware processors are configured by the instructions to apply natural language processing (NLP) techniques to the UML model to determine context for each or a subset of a UML node from amongst a plurality of UML nodes associated with the UML model. Also, the one or more hardware processors are configured by the instructions to identify a first set of components capable of being developed using a task driven (SW1.0) paradigm and a second set of components capable of being developed using a data driven (SW2.0) paradigm from amongst the plurality of components. The one or more hardware processors are configured by the instructions to identify the first and the second set of components based on a mapping of the input data with a context associated of the each or the subset of the plurality of UML nodes. Moreover, the one or more hardware processors are configured by the instructions to identify one or more components from the first set of components to be migrated from the task driven paradigm to the data driven paradigm, train a reinforcement learning (RL) model for facilitating migration of the one or more components from the first set of components to be migrated from the task driven paradigm to the data driven paradigm. To train the RL model, the one or more hardware processors are configured by the instructions to obtain a plurality of test cases associated with the task driven paradigm from a rule-based engine, perform multiple executions of a task driven function based on the plurality of test cases, wherein the task driven function is associated with the task driven paradigm, generate one or more recommendations for the multiple executions in form of 'actions' for the data driven paradigm, receive one or more responses to the one or more recommendations from a user, wherein the one or more responses are recorded by the RL model, associate a reward for each of (action, response) pairs, generate a plurality of tuples comprising (action, response, rewards), and train a deep learning (DL) model based on the plurality of tuples to obtain an enhanced version of the one or more components in the data driven paradigm, wherein the DL model is trained until a stopping criteria associated with a threshold value of the reward is met. Further, the one or more hardware processors are configured by the instructions to integrate the enhanced version of the one or more components with the second set of components to develop an integrated IT application.

In yet another aspect, a non-transitory computer readable medium for a method for accelerating development and deployment of an information technology (IT) application is provided. The method includes receiving, via one or more hardware processors, an input data comprising requirement specifications, use-cases and data sources associated with the IT application. Further, the method includes identifying, via the one or more hardware processors, a plurality of components for the development of the IT application based on mapping of the input data with a unified modelling language (UML) model. Furthermore the method includes applying natural language processing techniques (NLP) to the UML model to determine context for each or a subset of a UML node from amongst a plurality of UML nodes associated with the UML model, via the one or more hardware processors. Also, the method includes identifying, via the one or more hardware processors, a first set of components capable of being developed using a task driven (SW1.0) paradigm and a second set of components capable of being developed using a data driven (SW2.0) paradigm from amongst the plurality of components, wherein the first and the second set of components are identified based on mapping of the input data with a context associated of the each or the subset of the plurality of UML nodes. Moreover, the method includes identifying one or more components from the first set of components to be migrated from the task driven paradigm to the data driven paradigm, via the one or more hardware processors. Also, the method includes training, via the one or more hardware processors, a reinforcement learning (RL) model for facilitating migration of the one or more components from the first set of components to be migrated from the task driven paradigm to the data driven paradigm. Training the RL model includes obtaining a plurality of test cases associated with the task driven paradigm from a rule-based engine, performing multiple executions of a task driven function based on the plurality of test cases, wherein the task driven function is associated with the task driven paradigm, generating one or more recommendations for the multiple executions in form of 'actions' for the data driven paradigm, receiving one or more responses to the one or more recommendations from a user, wherein the one or more responses are recorded by the RL model, associating a reward for each of ('action', response) pairs, generating a plurality of tuples comprising (action, response, rewards), and training a deep learning (DL) model based on the plurality of tuples to obtain an enhanced version of the one or more components in the data driven paradigm, wherein the DL model is trained until a stopping criteria associated with a threshold value of the reward is met. The method further includes integrating, via the one or more hardware processors, the enhanced version of the one or more components with the second set of components to develop an integrated IT application.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
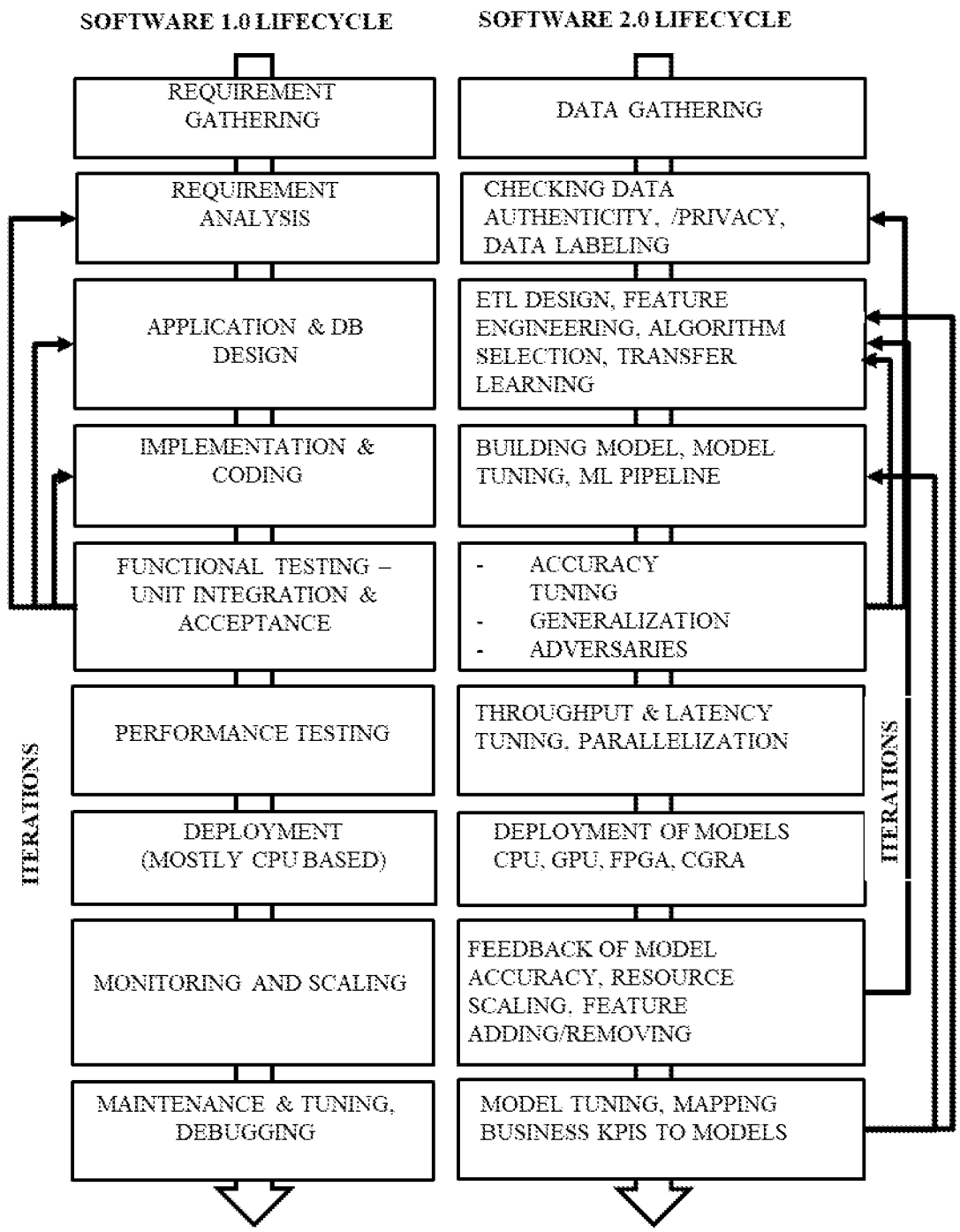
FIG. 1 illustrates an example software 1.0 and software 2.0 lifecycle according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The availability of huge amount of data and high-performance computing architecture have resulted in the usage and advancement of machine learning (ML) algorithms at a large scale. These algorithms are used to automate complex functions in numerous domains such as physical sciences for discovering new materials and to assist business managers in making decisions in enterprise. An exponential increase in the research in artificial intelligence technologies, including deep-learning neural networks, has led to systems, which in many scenarios have surpassed human capabilities. This has led to a shift from the traditional task-driven applications to data-driven models. Now a days, business managers prefer neural network models over a conventional decision-making system to make business choices. Also, some of the enterprise applications such as invoice processing can be done efficiently using data-driven models bypassing human interventions. An example is provided below to illustrate the effect of proliferation of data-driven approaches in application building.

Example: An on-line retail company want to give an 'offer' to its customers who are more likely to buy the 'offer'. We have transaction data indicating the users' browsing behavior (click, purchase etc.). In a conventional approach, a domain expert visualizes the users behavior and uses data statistics with his own set of rules to categorize the set of customers, who can be targeted for the advertisement. However, a data-driven approach may require minimal interaction with the domain expert only to understand the semantic of the data and then machine learning pipeline is built to get the set of customers who are likely to click the advertisement. One such pipeline is 'Prescribe™', a benchmark for building machine learning pipelines to predict, 'next best offer' using the users' behavior data sets.

The proliferation of commodity based big data platforms and an exponential increase in the research in machine learning techniques has led to a change in application development paradigm from traditional control-flow Software 1.0 to data-flow Software 2.0 programming paradigm e.g. use of machine learning based models over customer-scoring methods for generating recommendations. The Software 2.0 paradigm includes a data-driven programming that requires specialized data management to get clean, governed and unbiased data sets, well defined neural network architectures for building a model, efficient model training, extensive testing and high-performance deployment. Unlike Software 1.0 paradigm, a Software 2.0 program's output is probabilistic in nature as the correctness is highly dependent on the size and quality of the input data, however the program's performance is deterministic. This has led to the research in specialized hardware and high-performance architectures for deep-learning algorithms. Also, the nature of Software 2.0 paradigm brings in heterogeneity in the entire life cycle starting from an application development stage until application deployment stage in the production environment and hence posing numerous architecture and performance challenges.

Typically, migration of traditional software applications to big data platforms is done because of the availability of large data sets and commodity server based distributed computing paradigms to process them. However, due to recent advancements in machine learning techniques and increased focus on the specialized hardware to support high compute/watt, there may be possibility of migration of a part of task-driven applications to data-driven models for automation and high performance. The data-driven programming of a function using neural network model is referred to as Software 2.0 or machine programming.

A Software 2.0 paradigm (henceforth, referred to as SW 2.0) programmer i.e, data scientist, specifies the desired goal along with the data, which is consumed by a neural network, while a traditional task-driven Software 1.0 paradigm (henceforth, referred to as SW 1.0) programmer is responsible for developing and maintaining a model, and processing the output of a model. For example, in FIG. 1, the data pre-processing tasks are done using SW 1.0 programs in the machine learning pipeline of a recommendation system. The next generation of data driven enterprise IT systems that are going to build, deploy and manage such applications are referred to as 'EIT System 2.0' as shown in FIG. 2.

The success in using data-driven trained models in businesses has led to the efforts of building frameworks and/or systems for democratizing Al. For example, a known system facilitates in building a model using domain functions, which can be used to label the large sized training data. The availability of a democratized Al framework motivates replacement of the task-driven functions by the data-driven models. Further, deterministic performance of SW 2.0 motivates development of the specialized hardware. Also, the probabilistic nature of output and data-driven approach of SW 2,0 gives rise to different set of problems to be solved, which were non-existent in the SW 1.0 environment.

The nature of SW 2.0 brings heterogeneity in the whole development stack due to numerous modeling frameworks, data models, data processing engines and hardware architectures used for development and deployment of SW 2.0 applications.

Figure 2:
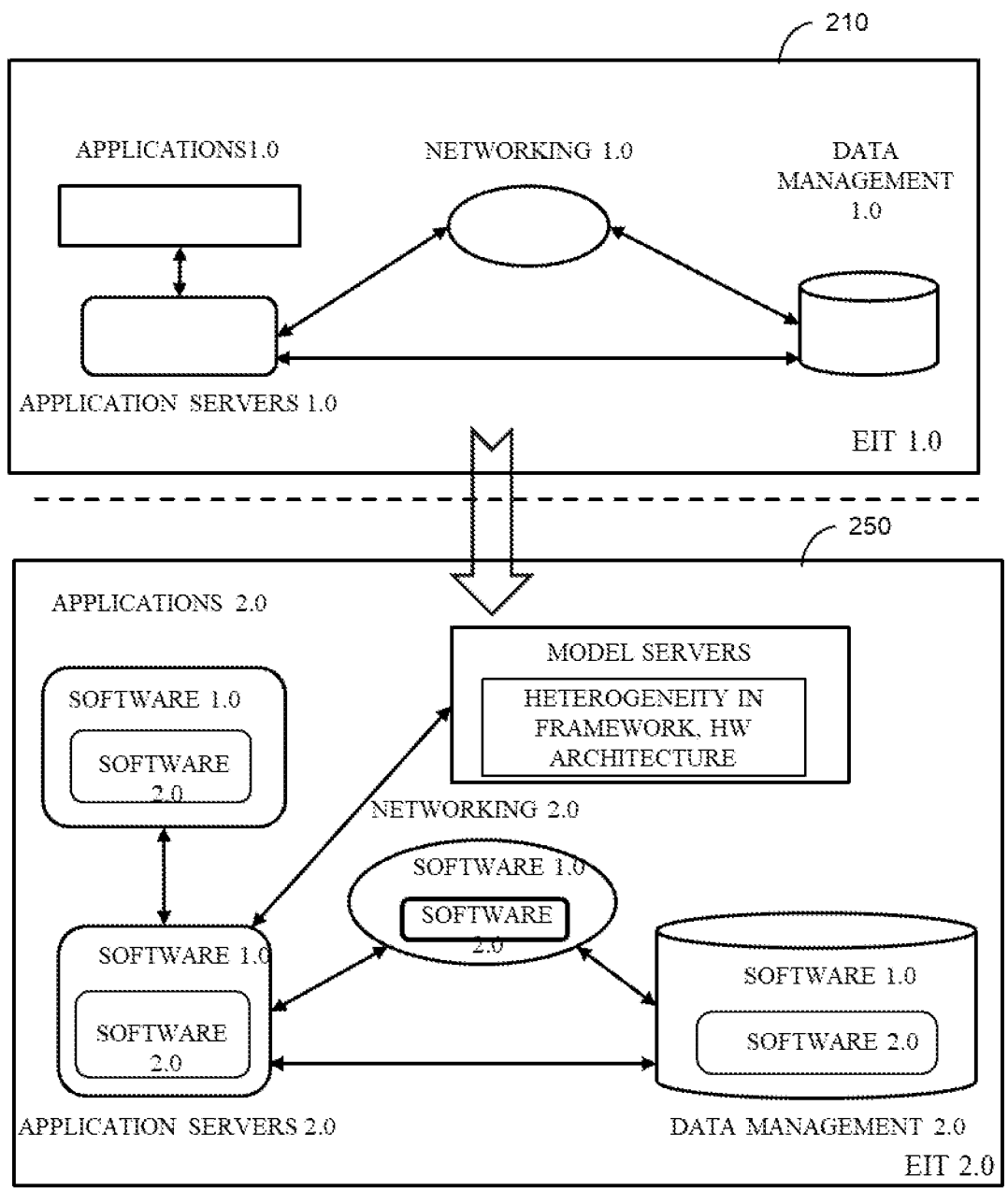
FIG. 2 is an example functional block diagram for transition from EIT1.0 and EIT 2.0, according to some embodiments of the present disclosure.

As illustrated in FIG. 2, a conventional enterprise IT system 210 (shown as EIT 1.0) has data management (DM 1.0), network management (NM 1.0), application servers and applications. These components are built using the traditional task-driven programming referred to as SW 1.0. The data-driven enterprise IT system i.e. EIT 2.0 (shown as 250 in FIG. 2) comprises of data management (DM 2.0), network management (NM 2.0), application servers and applications with model servers. Each of these components in EIT 2.0 employ SW 2.0 for automating some of their tasks i.e, some part of SW 1.0 is replaced with SW 2.0. The DM 2.0's core functionalities may be data-driven, e.g. query optimizer may use reinforcement learning or recurrent neural network and B-tree indexes may be replaced by models learnt on the data access pattern. A known system consists of core components of a database and is driven by an Al engine. Other known techniques are extensively using ML/DL models to replace core functionalities of classification, congestion control, resource and fault management, QoS and QoE management, and network security. There may be multiple ways of employing SW 2.0 elements in a database engine and network layer—single model for the whole component or multiple models, one for each of the elements of the component.

A SW 2.0 programming environment entails domain experts and data scientists working in close collaboration and managing a huge amount of data. A SW 2.0 application life cycle involves special data management (including data visualization, data cleaning, data governance, data labeling etc.), feature creation, model selection and building, model testing and deployment with various DevOps feedback loops unlike the waterfall approach in SW 1.0 as shown in the FIG. 1. Although, a SW 1.0 program is used in building peripheral tools such as data pre-processing routines and data visualizations for SW 2.0.

Figure 3:
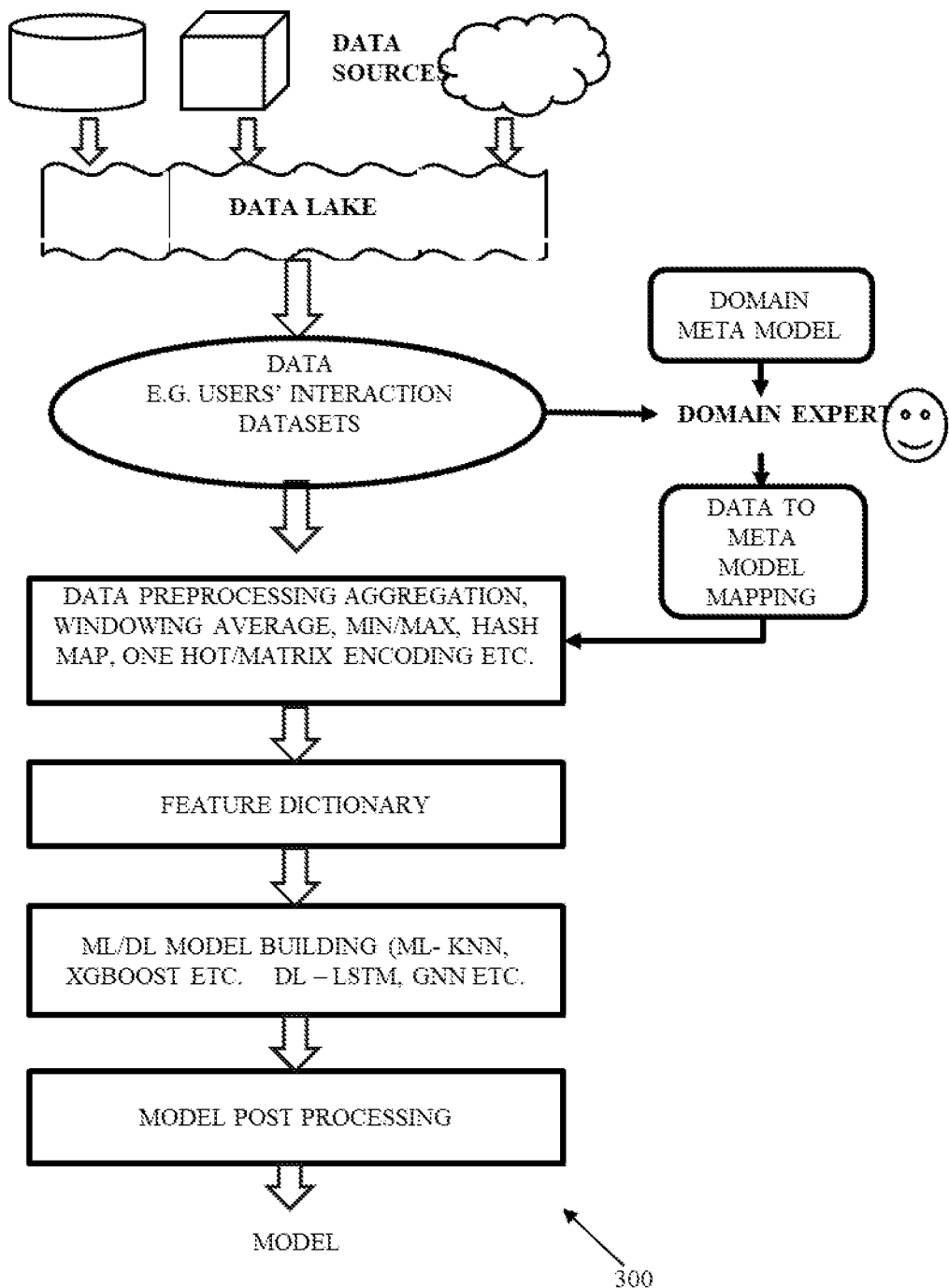
FIG. 3 illustrates an example of recommendation system ML/DL pipeline in accordance with some embodiments of the present disclosure.

Example: pipeline 300 of a known recommendation system, as shown in FIG. 3, consists of a data lake, which processes and stores clean and integrated data collected from various diverse sources. For a given use-case, data is fetched from the data lake, a domain expert maps the data to a meta-file using the specific meta-model. The system, automatically computes features using pre-processing functions, such as aggregation and one-hot encoding, from the meta-file and stores them in a 'feature dictionary' for reuse. These features are used for budding ML/DL models. After the post model processing, the final model is ready to be used in production. The whole pipeline employs SW2.0 programming, but SW1.0 programs are used for data selection, feature creation, data processing and model post processing.

SW 1.0 and SW 2.0 differ from each other in various aspects, including but not limited to, input and output, architecture, coding, accuracy and correctness, testing, deployment hardware, human resources, development life cycle, sensitivity and robustness, performance evaluation, and so no. The difference in aforementioned aspects with respect to SW1.0 and SW2.0 are described as under.

Input and Output: A SW1.0 program starts gathering business requirements to understand the working of an application i.e. 'how' part of the application whereas, a SW 2.0 programmer needs to understand 'what' the application does and gather the relevant data to model the 'what' part of the application. Since, the SW 2.0 is data driven, it needs to handle additional challenges of maintaining data privacy, provenance, governance and authenticity. A SW 1.0 program's scope of data is limited to business requirement, however a SW 2.0 based program may require collection of variety of data, such as structured, textual and semi-structured, spanning across the different units of an enterprise and outside as well. The quality of a SW 2.0 program depends on the quality and quantity of the collected data unlike of a SW 1.0 program, Architecture: In the SW 1.0, a solution architect focus on designing right set of functions' interfaces, however, in the SW 2.0 the focus is to choose the right architecture and algorithms for the deep-learning pipelines.

Coding: A SW 1.0 program will entail functional coding using imperative languages such as C++, Java etc. whereas, a SW 2.0 programmer will focus more on building and tuning a model built using AI frameworks.

Accuracy and correctness: The program correctness of SW 2.0 is governed by model accuracy3 unlike SW 1.0 that needs only functional testing for proving correctness.

Testing: A SW 1.0 program is tested only for the system level performance. A SW 2.0 program has additional requirements to test the model accuracy, which may be defined based on a use case along with the system performance.

Deployment hardware: A SW 1.0 program is mostly deployed on CPU based systems, whereas, a SW 2.0 program may use heterogeneous architectures for deployment e.g. a mix of TPU, GPU and FPGA. Therefore, resource provisioning tools will be different for both, Human resources: A SW 2.0 life cycle has data scientists, data engineers, system architect and SW 1.0 programmer unlike a SW 1.0 that may have solution architect and programmer as the major stakeholders.

Development life cycle: A SW 2.0 program life cycle may have more DevOps iterations and feedback loops to make the program production ready. This is due to the involvement of business experts and probabilities nature of SW 2.0 programs.

Sensitivity and robustness: A SW 2.0 program is highly sensitive to a slight perturbation in the input data unlike SW 1.0. In case of any change in requirements, a SW 1.0 life cycle will involve going back to the code development, however, a SW 2.0 lifecycle may require gathering of additional data for including any new features in the model Performance evaluation: Both these paradigms may have performance monitoring, testing and debugging but the context may be different, The components of EIT 2.0 have functions driven by both SW 1.0 and SW 2.0, increasing the complexity of an application development life cycle.

As described, unlike Software 1.0 paradigm, a Software 2.0 program's output is probabilistic in nature as the correctness is highly dependent on the size and quality of the input data, however the program's performance is deterministic. This has led to the research in specialized hardware and high-performance architectures for deep-learning algorithms. Also, the nature of Software 2.0 paradigm brings in heterogeneity in the entire life cycle starting from an application development stage until application deployment stage in the production environment and hence posing numerous architecture and performance challenges. Additionally, migration of a part of Software 1.0 to Software 2.0 poses certain challenges. For example, one of the key challenges is to determine what can be implemented using SW 2.0. Another challenge is to determine how to migrate a SW 1.0 programs to SW 2.0. Yet another challenge is accelerating development and deployment of systems implementing SW2.0. Still another challenge is accelerating performance engineering of SW 2.0 applications in EIT 2.0.

Various embodiments disclosed herein provides method and system for facilitating accelerating the development, deployment and performance engineering of an application in Software 2.0 paradigm. In one embodiment, the disclosed system is capable of determining/predicting the components of the application that may be task-driven (SW1.0) and/or those components which may be data-driven (SW2.0), For example, the disclosed system may take inputs including, but not limited to, business use case, data sources and requirements specifications, and based on said inputs, may decide the components that may be task driven (SW1.0) and/or data-driven (SW2.0), In an embodiment, the disclosed system may include an architecture for deploying SW2.0 pipeline, that includes a model management layer for heterogeneous architectures, model performance monitoring and feedback, model serving layer for heterogeneous architectures, accelerated middleware to support access to heterogeneous data engines, feature store, domain meta-models, data management and pre-processing tools, In another embodiment, the disclosed system provides models for performance management of applications incorporating components belonging to SW1.0 and SW2.0. Hereinafter, for the sake of brevity of description, the applications incorporating components belonging to SW1.0 and SW2.0 may be referred to as information technology (IT) 2.0 or IT2.0. The performance management system of IT2.0 may include a performance model of IT 2.0, performance benchmarking tools for EFT 2.0, tools for data visualization, feature creations and log analytics, and so on.

In yet another embodiment, the system provides a migrator for migration of components of the application from SW1.0 paradigm to SW2.0 paradigm. These are various other features of the disclosed embodiments are described further with reference to the description below.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Referring now to the drawings, and more particularly to FIG. 1 through 7B, where similar reference characters denote corresponding features consistently throughout the figures, there are shown preferred embodiments and these embodiments are described in the context of the following exemplary system and/or method.

Figure 4:
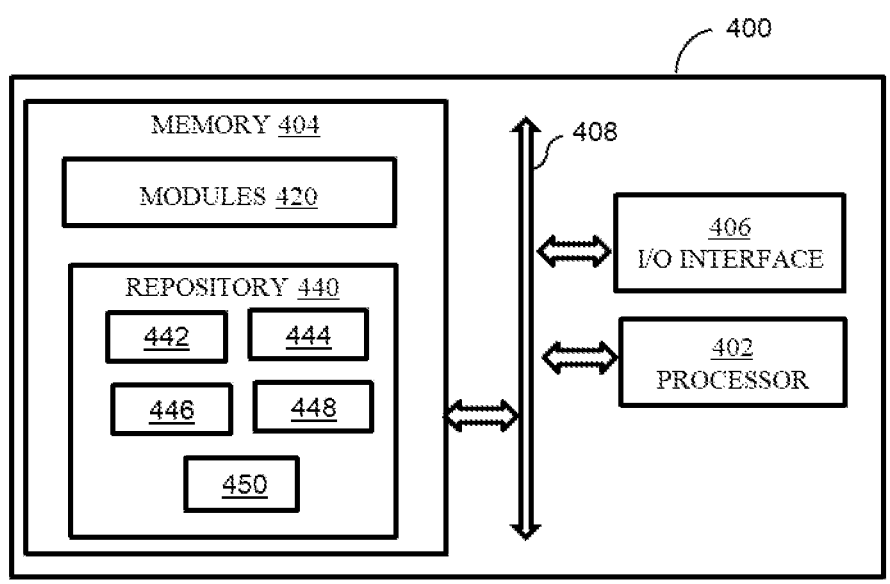
FIG. 4 is a block diagram of a system for accelerating developing and deployment of applications embodying software 1.0 and software 2.0 components, according to some embodiments of the present disclosure.

FIG. 4 illustrates a block diagram of a system 400 for accelerating development and deployment of applications in EIT2.0, in accordance with an example embodiment. The system 200 includes or is otherwise in communication with one or more hardware processors such as a processor 402, at least one memory such as a memory 404, and an I/O interface 406. The processor 402, memory 404, and the I/O interface 406 may be coupled by a system bus such as a system bus 208 or a similar mechanism. The I/O interface 406 may include a variety of software and hardware interfaces, for example, a web interface, a graphical user interface, and the like The interfaces 406 may include a variety of software and hardware interfaces, for example, interfaces for peripheral device(s), such as a keyboard, a mouse, an external memory, a camera device, and a printer. Further, the interfaces 406 may enable the system 200 to communicate with other devices, such as web servers and external databases. The interfaces 406 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 406 may include one or more ports for connecting a number of computing systems with one another or to another server computer. The I/O interface 406 may include one or more ports for connecting a number of devices to one another or to another server.

The hardware processor 402 may be implemented as one or more microprocessors, microcomputers, microcontrollers, digital signal processors, central processing units, state machines, logic circuitries, and/or any devices that manipulate signals based on operational instructions. Among other capabilities, the hardware processor 402 is configured to fetch and execute computer-readable instructions stored in the memory 404.

The memory 404 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 404 includes a plurality of modules 420 and a repository 440 for storing data processed, received, and generated by one or more of the modules 420. The modules 420 may include routines, programs, objects, components, data structures, and so on, which perform particular tasks or implement particular abstract data types.

The repository 440, amongst other things, includes a system database 442 and other data 444. The other data 444 may include data generated as a result of the execution of one or more modules in the other modules 430.

The disclosed system is capable of accelerating EIT2.0 by overcoming the challenges known in the art. For instance, the system is capable of determining the components of the application that can be implemented using SW2.0. Additionally, the system includes a migrator for migrating programs from SW 1.0 paradigm to SW 2.0 paradigm. Moreover, the system is capable of accelerating the development and deployment of the EIT2.0 by accelerating data management, accelerating model building using ML/DL pipeline, and accelerating AI democratization/democratizing framework. Also, the system is capable of accelerating performance engineering of SW 2.0 applications in EIT 2.0. The aforementioned functionalities of the system 400 along with the details of components enabling such functionalities is described further in the description below with reference to FIG. 5.

Figure 5:
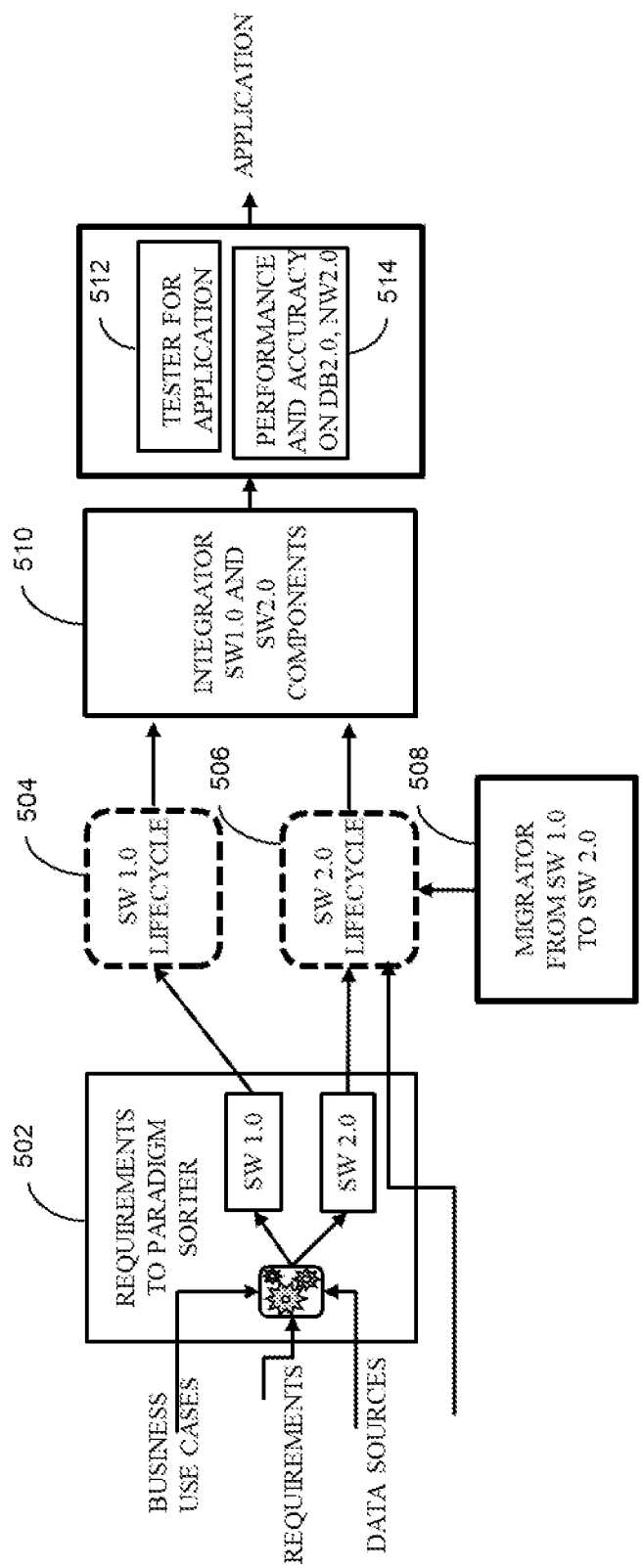
FIG. 5 is a pipeline architecture for a system for accelerating developing and deployment of applications embodying software 1.0 and software 2.0 components in accordance with some embodiments of the present disclosure.

FIG. 5 illustrates an architecture pipeline 500 to be implemented by the system 400 for accelerating development and deployment of applications in EIT2.0, in accordance with an example embodiment. The architecture pipeline 500 includes a paradigm sorter 502, a SW1.0 lifecycle component 504, a SW2.0 lifecycle component 506, a migrator 508, an integrator 510, a tester 512, and a performance management component 514. The aforementioned components of the pipeline 500 are described further in the description below.

The paradigm sorter 502 is capable of determining, from amongst a plurality of components associated with the application, a first set of components that can be developed using SW1.0 paradigm and a second set of components that can be developed using SW2.0 paradigm. An application which can be coded in a declarative manner in SW 1.0 has more scope to be coded in SW 2.0 by mapping the 'how' part of the application to a model. For example, a known recommendation application implements 'what products to recommend for a user'. This can be implemented in SW 1.0 using heuristic based scoring algorithms or in SW 2.0 using machine learning models. Functional programming based on lambda calculus offers a way of reasoning mathematically about computation. One of the properties of functional programming is to use higher order function, which allows a user to develop programs in a declarative manner without worrying about the algorithmic complexities. The SW2.0 paradigm is particularly useful in a scenario, where algorithms are complex and difficult to comprehend, e.g. image classification and natural language programming (NLP). Also, conventional components relying on heuristic or rules to take decisions have potential to be replaced with data learned models.

The paradigm sorter 502 receives input, via the one or more hardware processors, including not limited to, business use cases, data sources and requirements specification. Based on the input data, the paradigm sorter 502 determines the paradigm, i.e. one of SW1.0 and SW2.0 for development of multiple components of the application. The paradigm sorter 502 determines the paradigm for each of the plurality of components based one or more factors, including but not limited to, complexity of the logic (e.g. optimization) for building the application, availability of the input data, need for adaptation, level of determinism required, desired automation, and so on. In an embodiment, the paradigm sorter 502 may embody a set of rules combined with NLP models to automate the process of segregation of the plurality of components into a first set of components to be implemented using the SW1.0 paradigm and a second set of components to be implemented using the SW2.0 paradigm. In an embodiment, the NLP models employed by the paradigm sorter 502 may interpret the business requirements, classify data-driven and non-data driven requirements, and then map those set of requirements for program using SW1.0 or SW2.0. For example, Business processes are captured from the requirements by the domain experts. Each of the business process is specified in a programming language that may be capable of translating the business process into a unified modelling language (UML) (use case, entity (class), and business rules or actions (on the set of entities)). Interfaces between different entities may be identified by a domain expert. The paradigm sorter may apply natural language processing (NLP) to the UML model to determine context for each or a subset of a UML nodes from amongst a plurality of UML nodes associated with the UML model. In some embodiments, data structure used within SW1.0 may be coded using data-driven models.

In an embodiment, the paradigm sorter 502 may be capable of mapping business requirements to a set of components, which can be coded in SW2.0 to accelerate the process of application development. The paradigm sorter maps the input data with a context associated of the each or the subset of the plurality of UML nodes and identifies a first set of components capable of being developed using a task driven (SW1.0) paradigm and a second set of components capable of being developed using a data driven (SW2.0) paradigm from amongst the plurality of components. For example, the paradigm sorter 502 may enable a framework for mapping the business requirements to a set of components.

The paradigm sorter 502 identifies one or more components from the first set of components to be migrated from the task driven paradigm to data driven paradigm based on the mapping of business requirements to the set of components. The first set of components may include a graph of entities or class model connected to each other actions. The paradigm sorter may utilize a set of rules to specify use case, criticality, probabilistic/deterministic factor, and so on associated with the entities of the graph. The UML model is searched across the graph and if any UML node in UML has use case specified in the set of rules with probabilistic or deterministic factor greater than one and is non-critical, then that UML node may be selected for migration.

The disclosed system may include one or more compilers, which can take in SW 1.0 programs and replace relevant data structure or piece of code with SW 2.0 components. Herein, it should be noted that the framework may increase the complexity of the programs and hence debugging efforts may have to be enhanced. The system 400 may incorporate advanced debugging capabilities for accelerating the mapping of business requirements to a set of components.

In some embodiments, a SW1.0 component may evolve into SW 2.0 component by way of migration. For example, a business may have recommendation based on mathematical scoring method that may utilize parameters such as user's age, user preferences, location and so on. However, it is static and may not show desired result. Such a business (or application for that business) may be moved to data-driven models using migrator 508. In such scenarios, migration may be required for legacy SW1.0 components. The migrator 508 is configured to assist in the migration. In an embodiment, the migrator 508 may include a reinforcement learning (RL) framework for assisting in said migration. The RL framework is explained further with reference to FIG. 6 below.

Figure 6:
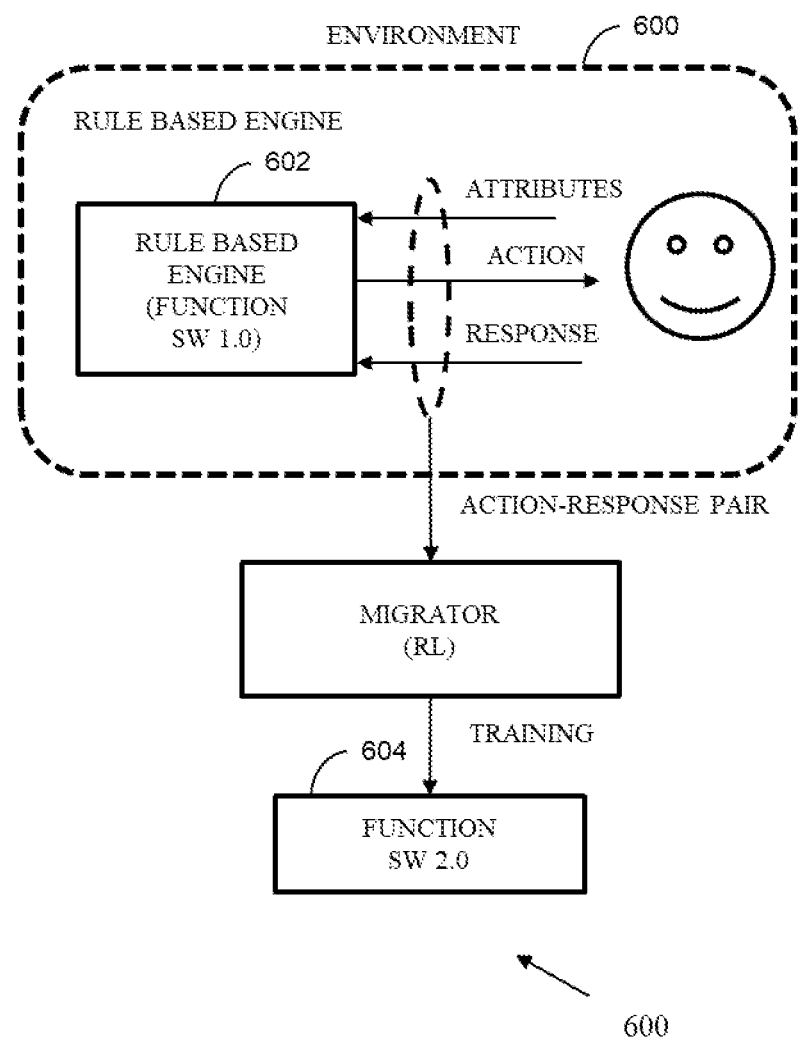
FIG. 6 illustrates a reinforcement learning (RL) framework for a migrator associated with the system of FIG. 4 in accordance with an example embodiment.

Referring to FIG. 6, a reinforcement learning (RL) framework 600 for the migrator 508 (FIG. 5) is described in accordance with an example embodiment. In an embodiment, the RL framework 600 includes a rule-based engine 602. The rule-based engine comprises a rule-based recommender which gives recommendations (i.e. performs 'Actions') to users depending on one or more user attributes. In some scenarios, the user may or may not like the recommendation. Such a user preference may be captured as 'Response' by the RL framework.

An analysis of the (Action, Response) pairs may facilitate in associating a reward with each (Action, Response) pair based on the use-case (i.e. choking behavior of the user). The dataset containing (Action, Response, reward) tuples is used for training a DL model. The DL model is used and further trained continuously by the RL based Migrator to obtained an enhanced version of the recommender, i.e. (Function SW 2.0, illustrated as 604 in FIG. 6. In an embodiment, the DL model is trained until a stopping criteria is met.

In an embodiment, the stopping criteria may be determined based on the 'Reward'. For example, herein the function SW1.0 and Function SW2.0 are in operation. SW1.0 function or task driven traditional function is any function which does not have potential to get migrated to data driven paradigm. Some of the users' requests with their attributes (input to Function SW 1.0) may be diverted to Function SW 2.0. Migrator maintains the running means of the rewards received by both Function SW 1.0 and Function SW2.0, If "Reward 1.0" is the running mean of the rewards received by Function SW 1.0, and "Reward 2.0" is the running mean of the rewards received by Function SW 2.0. then it may be determined whether Reward 2.0 is greater than Reward 1.0 continuously for a threshold (use-case specific) time period. If it is determined that Reward 2.0 is greater than Reward 1.0 continuously for the threshold time period for specific use-case specific, then, Function SW 2.0 is considered ready to replace Function SW 1.0.

In an embodiment, the migrator 508 may use test cases of SW1.0 to generate labeled data for its corresponding SW2.0 component. In an application, for example, a recommender application, if complex logic is involved, a training data such as (test case, output) may be generated from the function to identify, for each input, what the function outputs as the model is trained on (Input, Output) pairs.

In an embodiment, the migrator 508 may split existing monolithic SW 1.0 code (of the first set of components) into smaller functions (resembling microservices) such that these functions maintain purity and immutability. Migrating the components from the SW1.0 to SW2.0 may require appropriate training data to model the working of the function. In an embodiment, the migrator 508 may do multiple executions of a SW 1.0 function that can generate training data for its corresponding SW 2.0 model. However, the problem is to design the right test cases for executions of SW 1.0 components to generate comprehensive training data capturing both positive and negative labels for training the SW 2.0 model. All inputs to these functions are recorded as features and the output is in the form of labels. After certain iterations of refactoring these input and output data points may be saved. This in turn also solves the requirement of a large training set for SW 2.0. An example of replacement of a rule-based engine with a model driven system for classifying the mails is Gmail™, where the training data is generated by the existing rule-based system There may be connection between SW 1.0 and SW 2.0 in the context of overparameterization, where a program provides more capacity and accuracy than required for a given problem. In an embodiment, a reduction in the parameter space may further results in reduced computations, storage and communication cost and hence improved performance and energy consumption.

The development of SW1.0 components passes through traditional SW1.0 life cycle (as represented by SW1.0 module 504), while SW2.0 components may follow a SW2.0 lifecycle (as represented by SW1.0 module 506). The example SW1.0 and SW2.0 lifecycles with development and deployment components thereof for a recommendation engine are illustrated and described previously with reference to FIG. 1, where data pre-processing is employed using traditional function-based paradigm while actual recommendation is done using a model.

A SW2.0 component development may require a plurality of SW2.0 tasks for data-preprocessing, data visualization and feature generation. The entire application may have independent components of SW1.0, SW2O or nested structure of SW1.0 and SW2.0, The development of SW2.0 includes accelerating various components of ML pipeline, as shown in FIG. 1, such as data management, model building and AI democratization, which are precursor to deployment of any trained model in SW 2.0 environment. Accelerating the development of SW2.0 includes acceleration of data management, acceleration of ML/DL pipeline, acceleration of democratizing framework, model building, embracing heterogeneity, and debugging, as will be explained further in description below.

A key component in the development of a SW 2.0 program is data management both for data pre-processing and model budding. However, there may be challenges with managing the data involved in ML pipeline, Such challenges may include, but are not limited to, data labelling for supervised data-driven models, data consistency across training and inference, data privacy and auditing, and data processing for feature generation.

In an embodiment, data management (for data pre-processing and model building) may be accelerated by incorporating a data base schema for training and serving data, along with various data pre-processing and validation steps before getting into the ML pipeline. The aforementioned data management may be accelerated by offloading some of these tasks, such as data access operations, to a hardware accelerator. In an example embodiment, the hardware accelerator may include a data filter. For example, in case data within a range is to be fetched from storage, FPGA may be employed to filter the data and send only relevant data to the memory for processing. The data pre-processing has the requirement of quick data visualizations on heterogeneous data sources such as JSON, relational and graph in a data-lake.

In an embodiment, the data pre-processing may be accelerated by embodying software and hardware accelerators to speed up data processing and joining across heterogeneous platforms, such as a JSON processor built using FPGA. Similarly, accelerators may be built for Partiql, which is a common declarative language to access data over JSON and relational data model. This can accelerate data interactions for data scientists. A SW 2.0 program requires very large and labeled datasets to train a good model by using techniques, including but not limited to, transfer learning, data sampling and weak supervision. In an embodiment, the disclosed system may implement combinations of the aforementioned techniques to get 'time to train' accuracy for a data set. Additionally or alternatively, the disclosed system may implement crowd-sourcing or domain label functions for accelerating data labeling process, thereby reducing the human interventions. For example, the disclosed system may embody meta-models for different use cases in different industries. For instance, meta-model for a recommendation system in B2C may be used to generate features and auto-label the data (capturing business rules). These rules may be collected using crowd sourcing from people of same domain.

The disclosed system may further auto generate the labels from domain knowledge sources by building domain specific meta-models and use such domain specific meta-models along with given data sets to learn domain functions.

In an embodiment, the system 400 is capable of accelerating data management by accelerating ML/DL Pipeline. A model training process is a data-flow pipeline working on different data models albeit in deterministic time e.g. row data going to a column store for an operation and finally moving to a n-dimensional tensor for features creation. The disclosed system is capable of offloading the transformation and data pre-processing functions to accelerators, thereby achieving speed-up in these operations. In an embodiment, the disclosed system 400 is capable of using and further developing target-specific data transformation function to reduce data pre-processing time. For example, in a model building pipeline, columns may be transformed on the fly, using FPGA as an accelerator. Similarly, a recommender engine pipeline may utilize a hardware accelerator for aggregation and windowing pre-processing functions.

In an embodiment, the system 400 may be capable of generating an efficient feature store to bypass feature engineering in SW2.0. Feature engineering is a computationally intensive process and a pipeline execution time is spent mostly in deriving features. Also, related SW 2.0 elements of an application may require same features, Having a feature store may enhance reuse of pre-derived features for different ML/DL pipelines. For example, a feature store may be generated for storing features for XGBoost and LSTM algorithms. Alternatively, new kind of dynamic data structures may design feature stores for efficient access and storage of different ML and DL algorithms. One approach is self-learned data systems. In an embodiment, a meta-model may be utilized to understand the types, number and size of features used in ML pipeline. Said meta-mod& may work with given data and generate features. Meta-model may control the size of memory used for features. Therefore, the memory store may be dynamic in nature limiting to the required size only.

In an embodiment, the entire pipeline 506 of SW2.0 may be accelerated by developing on specialized hardware. There are a wide variety of hardware platforms and processors for accelerating ML/DL pipeline such as Plasticine, a CGRA, a GPU based system from Nividia™, and so on. The system 400 may be configured to design mapping model building algorithms for these new hardware architectures. Some of the ML frameworks provides one click deployment on cloud for models developed using MXNet, PyTorch, TensorFlow, and so on. The system 400 may integrate model building function with APIs of the aforementioned frameworks to automatically label data, train models, deploy them and use them for inference. Some of the well known ML frameworks includes, but are not limited to, AWS Sage-Maker™, MLFlow™, TFX™ and so on. Also, automatic hardware specific optimization and speedup in model budding functions is possible using compatible compilers and libraries by invoking methods from tools like AWS neo™, ONNX™, and so on.

The system 400 may facilitate accelerating the coding of multiple components of the same application using SW 2.0.

For example, the disclosed system 400 may employ a database to have AI driven components. These components may be trained separately as an individual task, or may employ gradient based meta-learning to develop single SW 2.0 model to perform these related multiple tasks. The former may require large amount of time for training (and retraining) one model for each component, however, the latter may build (and adapt online) single model using small data sets for each task. But, the latter may increase the complexity of debugging and testing of the application, The system 400 may accelerate a democratizing framework that may assist a data scientist to visualize, choose features and build models while being transparent to intricacies of the underlying systems. The abstraction brings its own performance challenges since abstraction gives flexibility but adds another layer of mapping the abstraction to underlying system so naturally increases execution time. In an embodiment, the disclosed system is capable of providing performance as well as abstraction. For example, the system 400 may include a set of libraries which can be accelerated internally for different targets and workloads. For instance, operators may be fused to reduce memory latency. In another example, a wrapper may be built around existing python libraries to accelerate given function to run optimally using Intel™ libraries. These libraries may be generalized for different architectures using knowledge of underlying hardware and duster of machines. A function in ML/DL pipeline may employ distributed learning algorithm depending on the training data size. In summary, a library may select an implementation of a function depending on the properties of the training data (e.g. size and distributions) and underlying deployment architecture (e.g. hybrid cloud, big data technology and hardware architectures).

A SW 2.0 program has constant time complexity of $O(1)$ such that whatever the input is, computation will be over in a fixed amount of time. However, finding the right network architecture for a SW 2.0 program may be a challenge, For example, AutoKeras™ and AutoML™ are generalized tools for automatic network search, but incurs lot of time (may be in days) to evaluate the space of the possible configurations before delivering the best network architecture. The system is capable of accelerating this search either using better optimization techniques or new system architectures to evaluate the space in parallel.

It will be understood that high performance design of SW 2.0 requires hardware-software codesign, which increases the need for hardware DSL to compile program components across different hardware. Certain hardware-target specific compilers such as Glow™, Spatial™, TVM™ and Google's MLIR™ are available for a target-specific execution of a complete application, but not for different components of the same application on different accelerators.

A SW 2.0 application may be coded for a specific heterogeneous hardware architecture and challenge is to port the application across different heterogeneous architectures. Wide availability of accelerators brings this challenge of portability of a trained model across different DL accelerators, For example, it may be challenging to deploy a SW 2.0 application developed for CPU+FPGA architecture on CPU+GPU architecture. The disclosed system may embody an accelerator (a specialized hardware) that may enable data-movement abstraction across different accelerators for a program portability across heterogeneous architectures. Such accelerator may include mother boards with shared memory between accelerators such as FPGA and CPU. In another embodiment, the system ay include DL algorithms for accelerators such as ColumnML™ and use them in ML/DL pipelines. The system may further be configured to integrate such algorithms in libraries to be used by data scientists, The integrator may be configured to identify right set of functions to convert libraries and their high-performance implementation. In an embodiment, the data transformation functions (for example, in C) may be generated, and used as library in Python for model building. More such function may be identified from each domain and utilized further.

The system 400 includes a debugging component for debugging SW2.0 applications co-existing with SW 1.0. The debugging component determines how to debug application correctness. Additionally, the debugging component determines whether the error is due to model's probabilistic nature or SW 1.0 semantics. The debugging component may utilize one or more of models' exhausts during application development, middleware logs and application logs to diagnose for any semantic failure. Additionally or alternatively, model assertions (similar to software assertions) may be used to detect a model's possible failures. The debugging component may facilitate human-machine collaboration to expedite and brings explanability to reduce errors in developing SW 2.0. In an embodiment, functional testing of the software may require explanability tools of SW2.0. In an embodiment, the system may further identify right places for human intervention without sacrificing the performance.

The system may include a deployment component for enabling deployment of the SW 2.0 applications. The SW 2.0 applications may exhibit hybrid deployments such that part of them deployed 'on-premise' and/or cloud with hybrid infrastructure and at the edge. The disclosed deployment component may embody a data-management control plane interacting with data stored either 'on-prem' or on 'cloud'. Further, deploying and optimizing models for each of these hardware platforms or processors may be enabled by implementing a plurality of trained models for a given application, and deployment may be based on target resource requirements. Furthermore, deployment of the SW 2.0 applications may be for different performance requirements with a variety of hardware accelerators. For example, a model less server may generate and leverage model-variants, versions of a model that differ in resource footprints, latency, costs, and accuracy.

In an embodiment, the disclosed system is capable of developing comprehensive benchmarks to address multiple use cases for varying data size, model algorithm, technology architecture and hardware accelerators for deploying SW 2.0 programs. Said benchmarks facilitates addressing end-to-end ML/DL pipeline. In an embodiment, the system is capable of generalizing the benchmarks enough to cater to a large set of use cases. In an embodiment, the disclosed system is capable of selecting the right set of technologies and frameworks for a desired accuracy and system performance.

A known benchmark includes 'time to accuracy' performance of DL applications on different hardware architectures (for both training and inference). Another known benchmark is obtained by a meta-model that captures personalization use cases for business-to-consumer domains and benchmarks a set of technologies. The disclosed system embodies a single benchmark to evaluate the performance of the whole SW 2.0 stack. The benchmark may incorporate multiple technology stack, multiple model building frameworks and heterogenous hardware. The benchmark may be domain specific for data-driven models used in the application. Further, the benchmark have control knobs to specify the deployment technology stack, data size used for training, model specific parameters. The benchmark may also collect metrics on model accuracy and system performance.

As is understood, the nature of SW 2.0 brings heterogeneity in its whole life cycle from data collection to model deployment, Data may be accessed from heterogeneous data processing engines supporting different data models (e.g. relational, graph, key-value, and so on). The access data may be interfaced transparently. The disclosed system includes a data management system that can process data efficiently exploiting heterogeneous memory and storage hierarchy e.g., smart SSD are seen in in-memory systems and NVRAM are used as persistent memory. The advancements in graph neural network to solve complex problems increases the size of model parameters and embedding, which may be big enough for current available memory. The disclosed system is capable of storing models' data efficiently while utilizing heterogeneous memory hierarchy. In an embodiment, the system may have a hierarchy of memory based on access latency and bandwidth ranging from high speed persistent memory, to NVRAM to FLASH and SSD. Data-driven models have embedding which need persistency and fast access so persistent memory may be selected for them. Different types of features, embedding may get stored in different types of the memory based on their requirements.

A SW 2.0 efficient deployment may involve heterogeneous hardware architectures. The disclosed system may include hardware DSLs such as Spatial to compile a SW 2.0 program across heterogeneous architectures. In an embodiment, the system may include to middleware to accelerate deploying applications efficiently in EIT 2.0. Data movement across heterogenous data structures such as Apache arrow™ may be accelerated using data transformers on accelerators.

Referring back to FIG. 5, the integrator 510 takes all components of the software/application and integrates them into a single unified integrated software. The integrator 510 ensures correct input/output interfacing of the plurality of components, which may be achieved by defining and designing clean interfaces across SW1.0 and SW2.0 components as well as incorporating their individual scalability aspects for meeting performance requirements.

The integrated software output from the integrator 510 is tested in a tester module 512 for use cases spanning across the plurality of components. It is assumed that individual components of SW1.0 (i.e. the first set of components) and SW2.0 (i.e. the second set of components) have been tested in their respective development life cycles. The test cases may be prepared keeping probabilistic nature of SW2.0 components. A semantic error in software could be due to semantic problems in SW1.0 or probabilistic nature of SW2.0.

The model tester 512 that defines the test cases, which may be a test data set in SW 2.0, to capture all possible scenarios. Since, a limited explanation is available on the behavior of a model, generating test data sets for checking all scenarios is a challenge. The system employs tools for generating test data sets for an application using the application's behavior description. In an embodiment, the model tester 512 facilitates in an accelerating the testing of models for generalization except a naive way of multi-fold testing on test data sets and data augmentation. A SW 2.0 program has more stakeholders in deployment such as data scientist, data engineer, system engineer, business manager and programmer as compared to only system engineer and programmer in SW 1.0. The ML/DL pipeline may interface for all stakeholders to accelerate the debugging and testing of the trained models.

The performance monitoring module 514 facilitates in accelerating performance monitoring, assurance, testing and modeling in EIT 2.0. Due to increase in the level of heterogeneity in SW 2.0 stack, there may be challenge for building compatible interfaces to share data across heterogeneous technologies for debugging a SW 2.0 application. This also increases the complexity in managing multiple monitoring tools and integrating the monitored data to detect anomalies. The traditional IT systems are mature enough to furnish low level system counter details for performance engineering, however the specialized hardware used for SW 2.0 are closed and do not have such mechanisms to understand their behavior during an application execution. The disclosed system includes accelerator specific APIs for gathering the performance metrics such as watt spent and execution time in various units within the accelerator.

The system 400 further determines the APIs that an Al driven component of EIT 2.0 (such as database system (DM 2.0)) need to provide to facilitate debugging mechanisms. EIT 2.0's workflow may be seen as data passing through a sequence of models. For example, an application may use output of a recommendation model to fetch data from a relational database using learned indices. For any error due to differences in the desired output and the actual output, it is not evident that which model is faulty—It could be the recommendation model or the database learned index model.

In a traditional enterprise IT system, the SW 2.0 models such as reinforcement learning based performance engineering of the conventional task-driven systems is used. An enterprise IT system needs to allocate resources for different components, such as data management layer and application servers, by monitoring the users' workload in a computing cluster, The disclosed system is capable of determining the appropriate resource allocation by employing reinforcement learning (RL) to capture the dynamism of the workloads. For performance engineering of EIT 2.0, the discloses system is capable of scheduling the resources among concurrent ML/DL pipeline driven by nature of workloads and using reinforcement learning. In an embodiment, the RL includes agents, environment and policy for rewards. In the present embodiment, RL can have IT system as environment and when an application is executed, the system can measure resource utilizations and number of jobs executed per time, thus higher number of executed jobs may result in higher rewards. The agent is the system scheduling the jobs. The jobs execution and resource utilization data collected can be used to train a model which define the policy. The agent keeps updating the policy by retraining the model.

In an embodiment, the performance monitoring module 514 is capable of exploiting sharing of training data sets, features or transfer learning among concurrent pipelines for efficient processing. In some of the ML models such as decision tree, inference time depends on the test data and may affect the desired latency. The disclosed system is capable of selecting right model for a given test data to ensure performance guarantee. In an embodiment, the performance prediction model is built to estimate a model's training time based on its deployment stack, type of model and model's parameters. This is simulation-based model to predict resource requirement for each model. A failure in EIT 2.0 may likely be due to model failure than any hardware resource constraint. A feedback mechanism may be needed from production system to model development to fix the production bugs.

The traditional IT system uses performance extrapolation models to estimate an application performance with larger workloads and data sizes for resource provisioning in production systems. There exist numerous performance modeling techniques and tools for SW 1.0 such as analytical model statistical, simulation based models, and so on. The disclosed system includes performance prediction models for DL/ML tasks, where execution time may depend on the deep-learning network architecture, data distribution, number of parameters, and so on.

The performance modeling of EIT 2.0 facilitates in determining the time required to train a model on a given hardware, how to leverage optimally and efficiently parallel and distributed computation in a given architecture, and how to provision resources efficiently for deployment of applications 'onprem', cloud infrastructure and hybrid cloud to reduce cost and power, and improve performance, Moreover, any new update in a model in response to new features may increase the size of the model and hence inference time. The disclosed system may facilitate in estimating the performance for refactoring in a SW 2.0 model. If a SW2.0 model takes longer to infer, the system may reduce number of features and generate two models—one with coarse grained features and another with detailed features. Most of the inference may use lighter model, Only in cases, where desired result is not in confidence interval, a detailed feature model may be used, thus refactoring model helps in accelerating the inference.

Additionally, cloud deployments may need models for containers and PODS. Similarly, network emulators have been used while testing SW 1.0 applications before deployment. The disclosed system may facilitate in domain specific data generation and model availability to choose right set of models for a desired network emulator.

A SW 2.0 model once trained on high performance systems may be deployed on resource constrained devices such as mobile phone. The techniques such as quantization, pruning and distillation are used by practitioners for reducing overparameterization in SW 2.0. However, the challenge is to use domain knowledge in these techniques for effective reduction in space and computations without sacrificing the model accuracy. The system may embody one or more hardware-target-specific performance extrapolation models to decide the right amount of reduction in parameter space for a given model accuracy. Model training time and accuracy depends on hardware—CPU, GPU, FPGA. The system may profile each of the hardware for different models and build target specific performance model to select right implementation of the model. Low compute devices, such as edge may yield low accuracy but fast inference. Having a model to decide right target for a given accuracy and inference time may help in taking right decision.

For example, the system may use performance results of popular ML/DL benchmarks on different hardware targets, for example, known benchmark results can be used to build the performance prediction model.

The aforementioned functionalities of the disclosed system 400 and pipeline 500 are described further with reference to a method in FIGS. 7A-7B below.

Figure 7A:
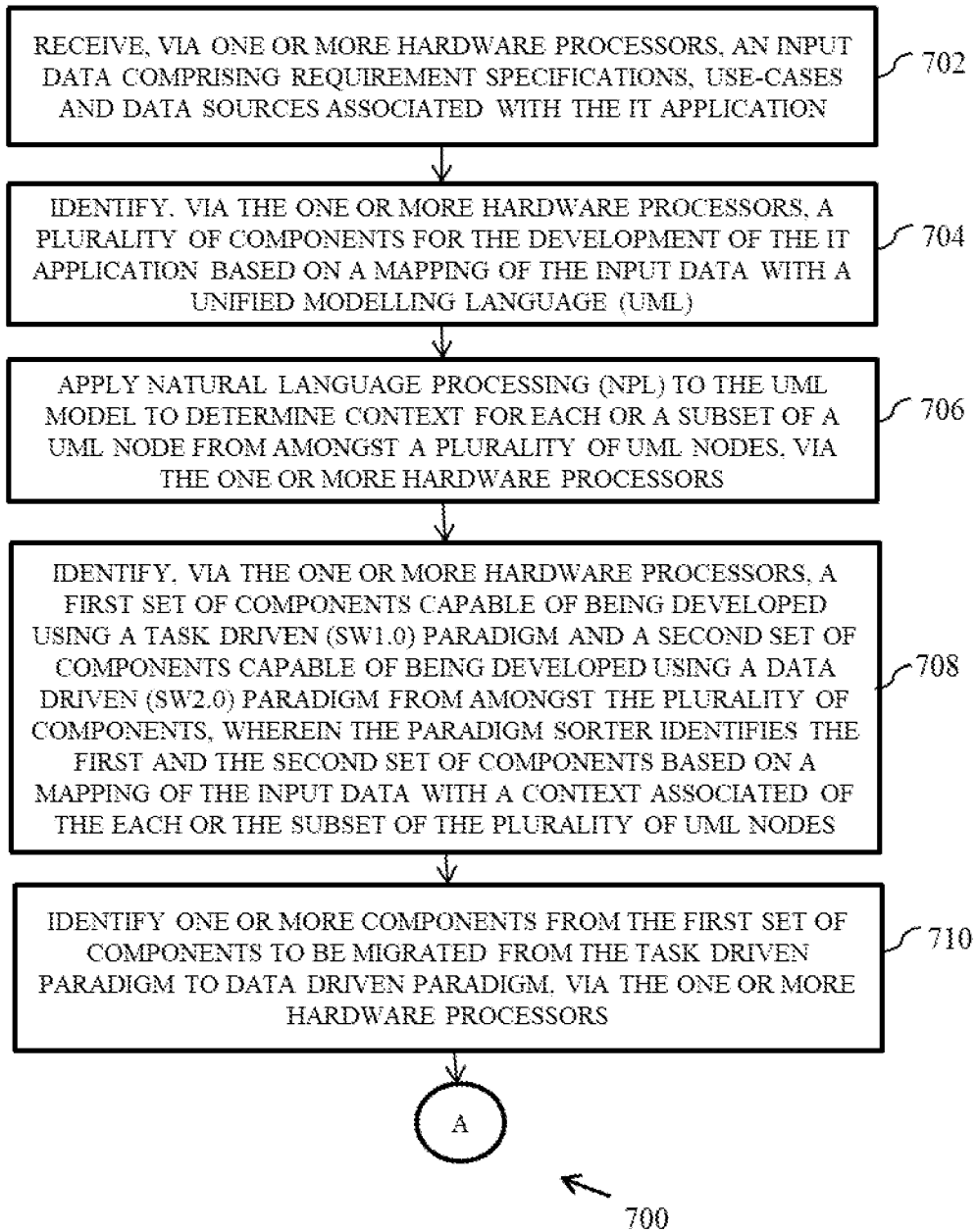
FIGS. 7A-7B illustrates a flow diagram of a method for accelerating development and deployment of enterprise applications in data driven enterprise IT, in accordance with some embodiments of the present disclosure.
Figure 7B:
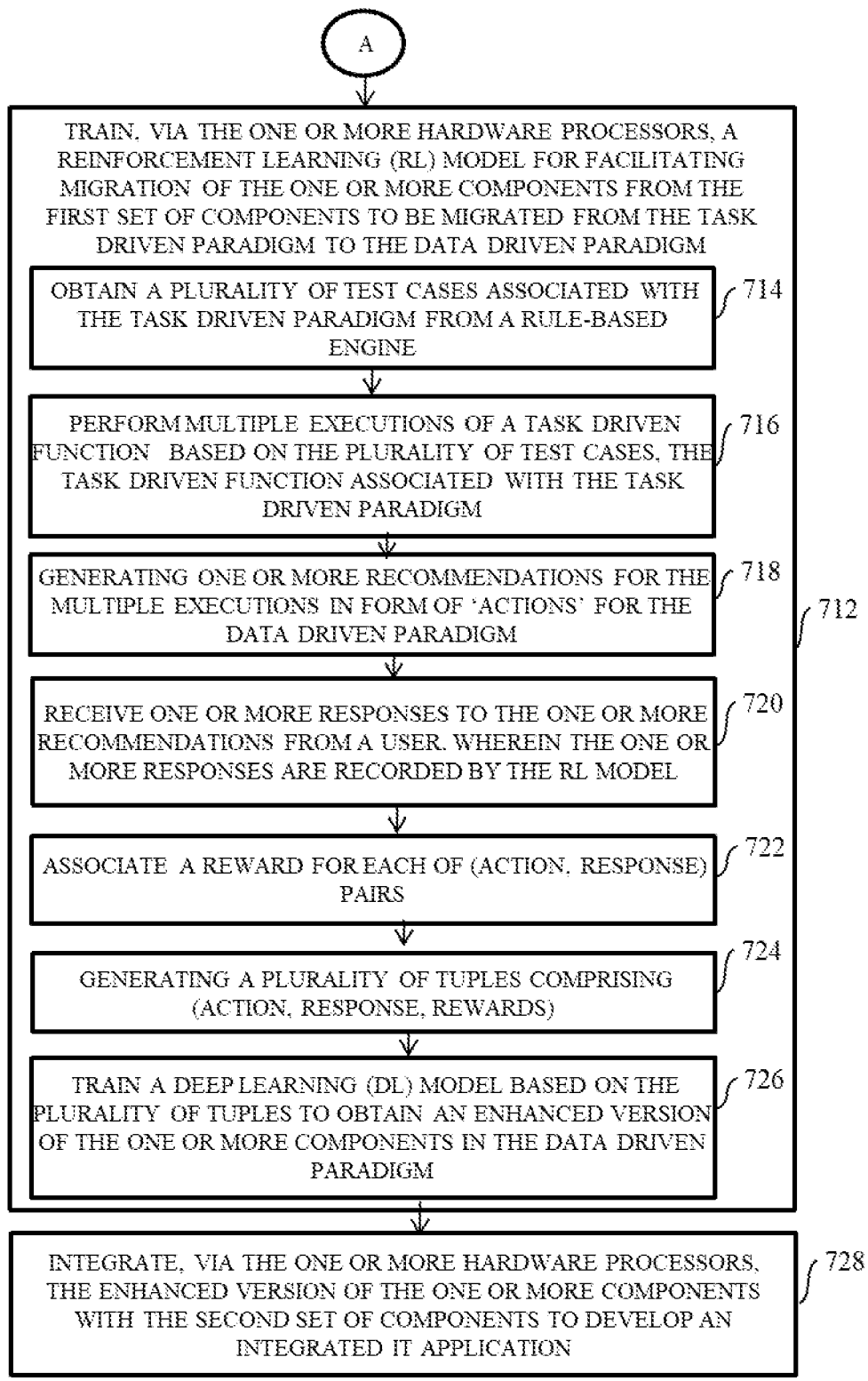

FIGS. 7A-7B illustrates a flow chart of a method 700 for method for accelerating development and deployment of enterprise applications in data driven enterprise IT, in accordance with some embodiments of the present disclosure.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 700 are described with help of system 400. However, the operations of the method 700 can be described and/or practiced by using any other system.

At 702, the method 700 includes receiving, via one or more hardware processors, an input data comprising requirement specifications, use-cases and data sources associated with the IT application. At 704, the method 700 identifying, via the one or more hardware processors, a plurality of components for the development of the IT application based on a mapping of the input data with a unified modelling language (UML). At 706, the method 700 includes applying natural language processing (NLP) to the UML model to determine context for each or a subset of a UML node from amongst a plurality of UML nodes, via the one or more hardware processors. At 708, the method 700 includes identifying, via the one or more hardware processors, a first set of components capable of being developed using a task driven (SW1.0) paradigm and a second set of components capable of being developed using a data driven (SW2.0) paradigm from amongst the plurality of components. Herein, the first and the second set of components are identified based on a mapping of the input data with a context associated of the each or the subset of the plurality of UML nodes. At 710, the method 700 includes identifying one or more components from the first set of components to be migrated from the task driven paradigm to data driven paradigm, via the one or more hardware processors. At 712, the method 700 includes training, via the one or more hardware processors, a reinforcement learning (RL) model for facilitating migration of the one or more components from the first set of components to be migrated from the task driven paradigm to the data driven paradigm. The method of training the RL model are mentioned further with reference to steps 714-726. The details of the steps have been explained with reference to FIG. 6 already, and hence for the purpose of brevity, are excluded from this description.

At 714, the method 700 includes obtaining a plurality of test cases associated with the task driven paradigm from a rule-based engine. At 716, the method 700 includes performing multiple executions of a task driven function based on the plurality of test cases, the task driven function associated with the task driven paradigm, At 718, the method 700 includes generating one or more recommendations for the multiple executions in form of 'actions' for the data driven paradigm. At 720, the method 700 includes receiving one or more responses to the one or more recommendations from a user, wherein the one or more responses are recorded by the RL model. At 722, the method 700 includes associating a reward for each of (action, response) pairs. At 724, the method 700 generating a plurality of tuples comprising (action, response, rewards). At 726, the method 700 training a deep learning (DL) model based on the plurality of tuples to obtain an enhanced version of the one or more components in the data driven paradigm. Herein the DL model is trained until a stopping criteria associated with a threshold value of the reward is met, At 728, the method 700 integrating, via the one or more hardware processors, the enhanced version of the one or more components with the second set of components to develop an integrated IT application.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

Various embodiments disclosed herein provides method and system for accelerating development and deployment of applications in EIT2.0. In an embodiment, the disclosed system leverages advancements in heterogeneous architectures for the benefit of application performance using SW2.0. For example, to leverage advancements in memory/storage hierarchy (RAM, persistent memory, Flash, NVeRAM, SSD, Sata, SAN), the disclosed system analyses data access pattern. A SW 2.0 model may be used to dynamically learn the data access pattern and decide the data placement, using an abstraction across the hierarchy. Since SW 2.0 automatically captures dynamism in an environment, so nonfunctional components of a conventional application are ideal candidates for acceleration. The SW 2.0 is a new data driven programming paradigm for building hyper-automation and deterministic high performative systems. The programming paradigm shift from task-driven SW 1.0 to data-driven SW 2.0 comes with a variety of challenges such as accelerating development, deployment, migration and performance engineering of systems using SW 2.0 programming paradigm. The disclosed system embodies an enterprise systems EIT 2.0 comprising of data management 2.0, network management 2.0 and model servers used by application servers. The EIT 2.0 system facilitates in accelerating the development and deployment of SW 2.0 applications in their life-cycle while embracing the heterogeneity in the SW2.0 stack.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item r items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein, The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A processor-implemented method for accelerating development and deployment of an information technology (IT) application, comprising:
   receiving, via one or more hardware processors, an input data comprising requirement specifications, use-cases and data sources associated with the IT application;
   identifying, via the one or more hardware processors, a plurality of components for the development of the IT application based on mapping of the input data with a unified modelling language (UML) model;
   applying natural language processing techniques (NLP) to the UML model to determine context for each or a subset of a UML node from amongst a plurality of UML nodes associated with the UML model, via the one or more hardware processors;
   identifying, via the one or more hardware processors, a first set of components capable of being developed using a task driven (SW1.0) paradigm and a second set of components capable of being developed using a data driven (SW2.0) paradigm from amongst the plurality of components, wherein the first and the second set of components are identified based on mapping of the input data with a context associated of the each or the subset of the plurality of UML nodes;
   identifying one or more components from the first set of components to be migrated from the task driven paradigm to the data driven paradigm, via the one or more hardware processors;
   training, via the one or more hardware processors, a reinforcement learning (RL) model for facilitating migration of the one or more components from the first set of components to be migrated from the task driven paradigm to the data driven paradigm, wherein training the RL model comprises:
      obtaining a plurality of test cases associated with the task driven paradigm from a rule-based engine;
      performing multiple executions of a task driven function based on the plurality of test cases, wherein the task driven function is associated with the task driven paradigm;

generating one or more recommendations for the multiple executions in form of 'actions' for the data driven paradigm;
receiving one or more responses to the one or more recommendations from a user, wherein the one or more responses are recorded by the RL model;
associating a reward for each of ('action', response) pairs;
generating a plurality of tuples comprising (action, response, rewards);
training a deep learning (DL) model based on the plurality of tuples to obtain an enhanced version of the one or more components in the data driven paradigm, wherein the DL model is trained until a stopping criteria associated with a threshold value of the reward is met; and
integrating, via the one or more hardware processors, the enhanced version of the one or more components with the second set of components to develop an integrated IT application.

2. The method as claimed in claim 1, further comprising building the second set of components using one or more AutoML libraries and corresponding data sets obtained after processing data coming from a plurality of data sources.

3. The method as claimed in claim 1, further comprising testing the first set of components, the second set of components, and the integrated IT application using a plurality of test cases.

4. A system for accelerating development and deployment of an information technology (IT) application, comprising:
one or more communication interfaces; and
one or more hardware processors coupled to the memory via the one or more communication interfaces, wherein the one or more hardware processors are configured by the instructions to:
receive an input data comprising requirement specifications, use-cases and data sources associated with the IT application;
identify a plurality of components for the development of the IT application based on a mapping of the input data with a unified modelling language (UML);
apply natural language processing (NLP) techniques to the UML mod& to determine context for each or a subset of a UML node from amongst a plurality of UML nodes associated with the UML model;
identify a first set of components capable of being developed using a task driven (SW1.0) paradigm and a second set of components capable of being developed using a data driven (SW2.0) paradigm from amongst the plurality of components, wherein the one or more hardware processors are configured by the instructions to identify the first and the second set of components based on a mapping of the input data with a context associated of the each or the subset of the plurality of UML nodes;
identify one or more components from the first set of components to be migrated from the task driven paradigm to the data driven paradigm;
train a reinforcement learning (RL) model for facilitating migration of the one or more components from the first set of components to be migrated from the task driven paradigm to the data driven paradigm, wherein to train the RL model, the one or more hardware processors are configured by the instructions to:
obtain a plurality of test cases associated with the task driven paradigm from a rule-based engine;

perform multiple executions of a task driven function based on the plurality of test cases, wherein the task driven function is associated with the task driven paradigm;
generate one or more recommendations for the multiple executions in form of 'actions' for the data driven paradigm;
receive one or more responses to the one or more recommendations from a user,
wherein the one or more responses are recorded by the RL model;
associate a reward for each of (action, response) pairs;
generate a plurality of tuples comprising (action, response, rewards); and
train a deep learning (DL) model based on the plurality of tuples to obtain an enhanced version of the one or more components in the data driven paradigm, wherein the DL model is trained until a stopping criteria associated with a threshold value of the reward is met; and
integrate the enhanced version of the one or more components with the second set of components to develop an integrated IT application.

5. The system of claim 4, further comprising building the second set of components using one or more AutoML libraries and corresponding data sets obtained after processing data coming from a plurality of data sources.

6. The system of claim 4, wherein the one or more hardware processors are configured by the instructions to test the first set of components, the second set of components, and the integrated IT application using a plurality of test cases.

7. One or more non-transitory machine readable information storage mediums comprising one or more instructions which when executed by one or more hardware processors cause a method to accelerate development and deployment of an information technology (IT) application, the method comprising:
receiving, via one or more hardware processors, an input data comprising requirement specifications, use-cases and data sources associated with the IT application;
identifying, via the one or more hardware processors, a plurality of components for the development of the IT application based on mapping of the input data with a unified modelling language (UML) model;
applying natural language processing techniques (NLP) to the UML model to determine context for each or a subset of a UML node from amongst a plurality of UML nodes associated with the UML model, via the one or more hardware processors;
identifying, via the one or more hardware processors, a first set of components capable of being developed using a task driven (SW1.0) paradigm and a second set of components capable of being developed using a data driven (SW2.0) paradigm from amongst the plurality of components, wherein the first and the second set of components are identified based on mapping of the input data with a context associated of the each or the subset of the plurality of UML nodes;
identifying one or more components from the first set of components to be migrated from the task driven paradigm to the data driven paradigm, via the one or more hardware processors;
training, via the one or more hardware processors, a reinforcement learning (RL) model for facilitating migration of the one or ore components from the first set of components to be migrated from the task driven paradigm to the data driven paradigm, wherein training the RL model comprises:
obtaining a plurality of test cases associated with the task driven paradigm from a rule-based engine;
performing multiple executions of a task driven function based on the plurality of test cases, wherein the task driven function is associated with the task driven paradigm;
generating one or more recommendations for the multiple executions in form of 'actions' for the data driven paradigm;
receiving one or more responses to the one or more recommendations from a user, wherein the one or more responses are recorded by the RL model;
associating a reward for each of ('action', response) pairs;
generating a plurality of tuples comprising (action, response, rewards);
training a deep learning (DL) model based on the plurality of tuples to obtain an enhanced version of the one or more components in the data driven paradigm, wherein the DL model is trained until a stopping criteria associated with a threshold value of the reward is met; and
integrating, via the one or more hardware processors, the enhanced version of the one or more components with the second set of components to develop an integrated IT application.

* * * * *